United States Patent
Seto (10) Patent No.: US 10,348,931 B2
(45) Date of Patent: Jul. 9, 2019

(54) IMAGE FORMING APPARATUS FOR FORMING AND OUTPUTTING IMAGE ON MEDIUM

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/024,489

(22) Filed: Jun. 29, 2018

(65) Prior Publication Data
US 2019/0007583 A1 Jan. 3, 2019

(30) Foreign Application Priority Data

Jun. 30, 2017 (JP) ................................. 2017-128328

(51) Int. Cl.
*H04N 1/44* (2006.01)
*G06F 3/12* (2006.01)
*G06K 9/00* (2006.01)

(52) U.S. Cl.
CPC ......... *H04N 1/4493* (2013.01); *G06F 3/1222* (2013.01); *G06F 3/1238* (2013.01); *G06F 3/1252* (2013.01); *G06K 9/00288* (2013.01); *G06K 9/00456* (2013.01)

(58) Field of Classification Search
USPC ....................................................... 358/1.14
See application file for complete search history.

(56) References Cited

U.S. PATENT DOCUMENTS

| | | | |
|---|---|---|---|
| 2009/0066987 A1* | 3/2009 | Inokuchi | G03G 15/36 358/1.13 |
| 2009/0279114 A1* | 11/2009 | Sakurai | G06F 3/121 358/1.12 |
| 2010/0238512 A1* | 9/2010 | Kimura | G06F 3/1222 358/3.24 |
| 2016/0371040 A1* | 12/2016 | Idehara | G06F 3/1238 |
| 2017/0264786 A1* | 9/2017 | Nishida | H04N 1/00037 |

FOREIGN PATENT DOCUMENTS

JP 2007-288330 A 11/2007

OTHER PUBLICATIONS

Sato; JP 2007-288330; Nov. 1, 2007; Fuji Xerox; English Translation and Applicable Drawings (Year: 2007).*

* cited by examiner

*Primary Examiner* — Neil R McLean
(74) *Attorney, Agent, or Firm* — Hawaii Patent Services; Nathaniel K. Fedde; Kenton N. Fedde (57) ABSTRACT

Provided is an image forming apparatus that is capable of protecting the confidentiality of an image that is printed and outputted on paper. The image forming apparatus according to this disclosure is an image forming apparatus that outputs paper on which an image is formed. The image forming apparatus includes an imaging unit, a user-recognizing unit, a person-recognizing unit, and a control unit. The imaging unit performs imaging of the surroundings. The user-recognizing unit recognizes a user of the image forming apparatus. The person-recognizing unit recognizes persons in imaging data obtained by the imaging unit. The control unit performs confidentiality-protected output of outputting the paper so that the image on the paper is shielded when the person-recognizing unit recognizes another person who is other than the user in the imaging data.

11 Claims, 9 Drawing Sheets

IMAGE FORMING APPARATUS FOR FORMING AND OUTPUTTING IMAGE ON MEDIUM

INCORPORATION BY REFERENCE

This application is based on and claims the benefit of priority from Japanese Patent Application No. 2017-128328 filed on Jun. 30, 2017, the contents of which are hereby incorporated by reference.

BACKGROUND

The present disclosure relates to an image forming apparatus for forming and outputting an image on a medium.

As an image forming apparatus for forming and outputting an image on a medium, multi function printers (MFP) having a printing function for printing out document files and the like, a scanner function for reading an image from a document, a copy function for printing and outputting a read image on paper, a facsimile function, and the like are popular. This kind of image forming apparatus may be installed in a workplace, however, often such image forming apparatuses are also installed in commercial facilities such as convenience stores and the like. MFPs are large and expensive, so especially when an individual uses an MFP for personal use, the individual often uses an MFP that is installed in a commercial facility.

On the other hand, people can freely enter and leave such commercial facilities. Therefore, special care is required when handling highly confidential information by such MFPs. For example, care is required when this kind of confidential information is displayed on a printing preview screen on a display unit (display) of the MFP. Therefore, in typical technology, there are image forming apparatuses in which a sensor recognizes the state of moving bodies (people) around the MFP and sets the confidentiality of the information according to that state, and when confidentiality is high, performs an operation so that the image on the display unit is reduced and becomes difficult to see, or performs an operation so that the image is not displayed. As a result, when confidentiality is determined to be high, that confidentiality is maintained by the preview image related to such information becoming difficult or impossible to see by other people in the vicinity of the MFP.

SUMMARY

The image forming apparatus according to this disclosure is an image forming apparatus that outputs paper on which an image is formed. The image forming apparatus includes an imaging unit, a user-recognizing unit, a person-recognizing unit, and a control unit. The imaging unit performs imaging of the surroundings. The user-recognizing unit recognizes a user of the image forming apparatus. The person-recognizing unit recognizes persons in imaging data obtained by the imaging unit. The control unit performs confidentiality-protected output of outputting the paper so that the image on the paper is shielded when the person-recognizing unit recognizes another person who is other than the user in the imaging data.

DETAILED DESCRIPTION

Figure 1:
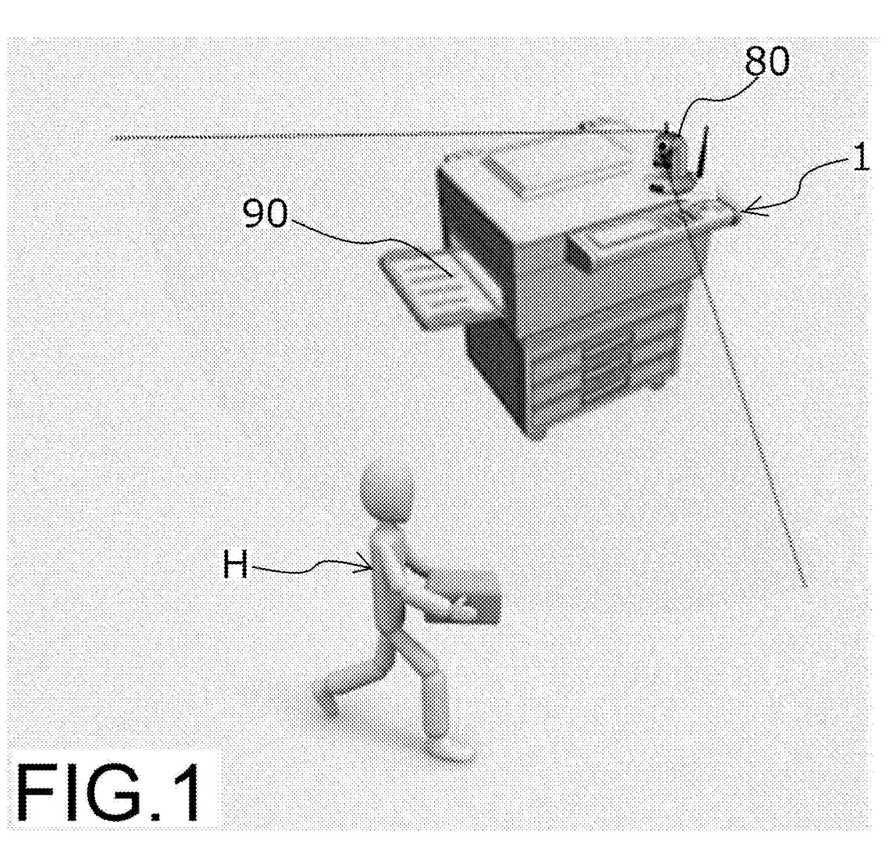
FIG. 1 is a perspective view illustrating a state when an image forming apparatus of an embodiment according to present disclosure is used.
Figure 2:
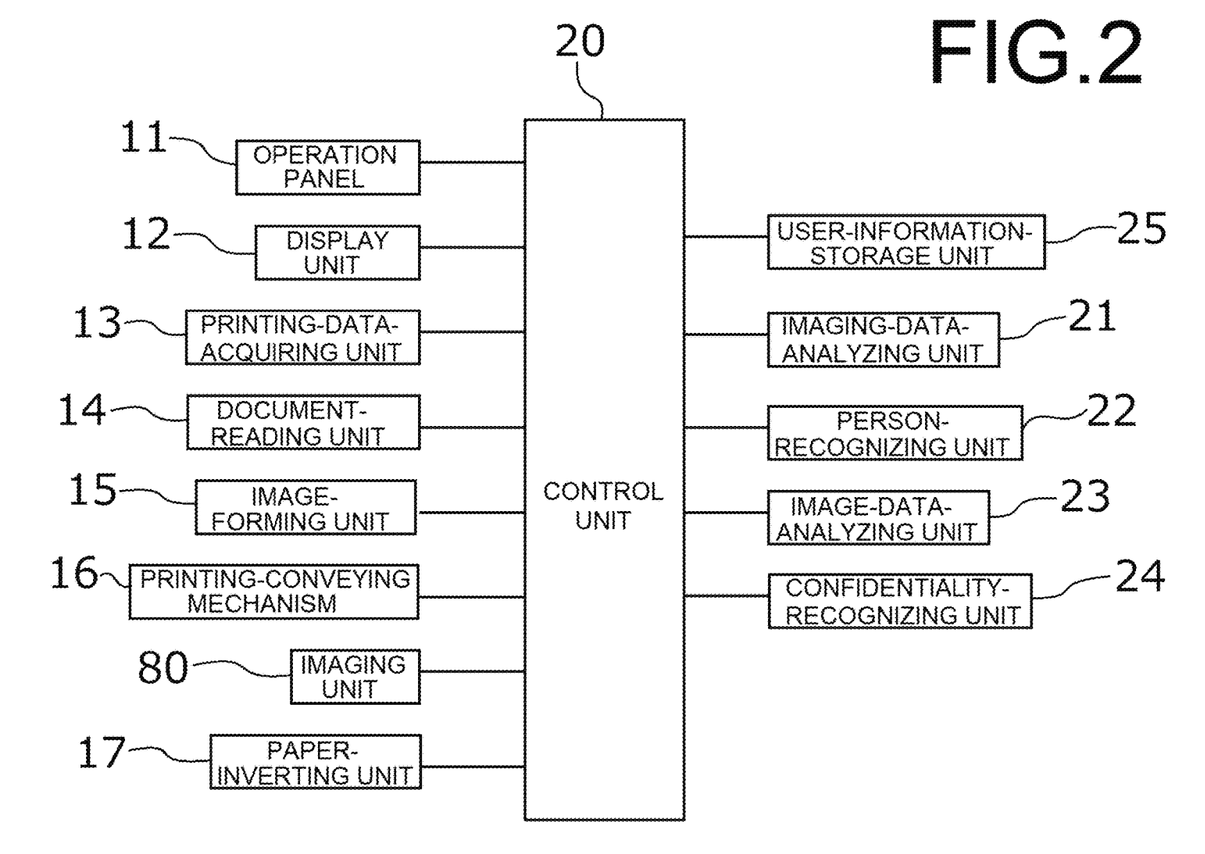
FIG. 2 is a block diagram illustrating configuration related to control of an image forming apparatus of an embodiment according to the present disclosure.

In the following, forms for embodying the technology according to the present disclosure will be explained with reference to the drawings. FIG. 1 is a perspective view illustrating a state when an image forming apparatus 1 of an embodiment according to present disclosure is used. FIG. 2 is a block diagram illustrating configuration related to control of the image forming apparatus 1. This image forming apparatus 1 is a multi function peripheral (MFP) that forms images acquired by various methods on paper, and outputs the paper to a paper-discharge unit 90 illustrated in FIG. 1. Moreover, this image forming apparatus 1 includes an imaging unit (camera) 80 for taking an image of the surroundings and acquiring image data. In FIG. 1, the image unit 80 takes an image of people H in the vicinity of the image forming apparatus 1. The people H are classified as a user of the image forming apparatus 1 (person that operates the image forming apparatus 1 so that paper is outputted to the paper-discharge unit 90), and as people other than the user.

In FIG. 2, this image forming apparatus 1 is operated by a user operating an operation panel 11. A display unit (display) 12 is provided on the upper portion of the image forming apparatus 1, and displays the state of the image forming apparatus 1 and instructions for the user, and is used as an auxiliary unit when the user operates the operation panel 11. An image that is formed on paper is outputted according to printing data that is acquired from a printing-data-acquiring unit 13 via a connected storage medium for example. Moreover, an image can also be formed on paper from image data that is acquired by a document-reading unit (scanner) 14 optically reading a document on which an image is formed. Furthermore, the image data that is acquired from the document-reading unit 14 can also be stored in a connected storage medium.

The operation for forming an image on paper is mechanically performed by an image-forming unit 15. In the image-forming unit 15, an image pattern that is composed of toner is formed on paper, after which that image is fixed. Finally, the paper is directed and outputted to the paper-discharge unit 90 in FIG. 1. This kind of operation is performed while the paper is conveyed inside the image forming apparatus 1. Moreover, a paper-conveying mechanism 16 that includes plural rollers and the like for conveying paper is provided in the image forming apparatus 1. Actually, the paper-conveying mechanism 16 is configured by being dispersed at various locations in the image forming apparatus 1. A control unit 20 that is a CPU controls the components described above, and causes those components to perform the operations described above. Furthermore, the control unit 20 controls the imaging unit 80 described above so as to be able to take an image of the surroundings of the image forming apparatus 1.

Here, an imaging-data-analyzing unit (user-recognizing unit) 21, a person-recognizing unit 22, an image-data-analyzing unit 23, and a confidentiality-recognizing unit 24 that are processors for performing various operations on various kinds of data are connected to the control unit 20.

The imaging-data-analyzing unit 21 analyzes imaging data that is obtained by the imaging unit 80. Then, when there is a person H in that imaging data, the person H is recognized by a known pattern-recognition method. Here, when a user is using this image forming apparatus 1 and performs some operation on the operation panel 11, the control unit 20 causes the imaging unit 80 to take an image of this state. Therefore, the person H that is recognized in the imaging data in this state can be recognized as the user. Particularly, by setting the positional relationship between the operation panel 11 and the imaging unit 80 so that an image of the face of the user can be taken by the imaging unit 80 when the user operates the operation panel 11, it is easy to recognize the face of the user. Face data of the user that is obtained in this way can be stored in a user-information-storage unit 25, and after that, can be used as identification information for identifying the user. Moreover, here, the operation that will be the target of control after this is the operation for outputting paper on which an image is formed to the paper-discharge unit 90 (operation for performing printing and outputting), and operations other than this are not related to this disclosure. Therefore, a user in the following explanation means a person that operates the image forming apparatus 1 in order to perform this kind of printing and outputting.

After that, when imaging is performed by the imaging unit 80 and a person H is recognized in the image data by the imaging-data-analyzing unit 21, the person-recognizing unit 22, by referencing the information in the user-information-storage unit 25, can recognize whether the recognized person H is the user or another person. Alternatively, when plural persons H are recognized in the imaging data, the person-recognizing unit 22 can recognize whether or not other persons are included in that imaging data. The determination result of whether or not other persons are included in this imaging data will be used in operation that will be explained hereafter.

Moreover, the image-data-analyzing unit 23 recognizes characters in an image that is formed on paper by the image-forming unit 15. When recognizing whether or not there is a preset specific character string in this image and the confidentiality-recognizing unit 24 recognizes such a character string, it is possible to recognize that this image is a target for confidentiality protection (this image is confidential). More specifically, examples of this kind of character string include: "conference", "meeting", "briefing", "management policy", "business results", "internal memo", "company secret", "secret", "safety", "confide(ntial)", and the like.

Here, paper on which an image is formed is outputted to the paper-discharge unit 90 by either normal output (output is performed without any consideration of protecting confidentiality), or by confidentiality-protected output. When an image to be outputted is recognized to be a target for confidentiality protection, and persons other than the user (other persons) are recognized in the vicinity of the image forming apparatus 1, the control unit 20 causes confidentiality-protected output to be performed. In cases other than this, the control unit 20 causes normal output to be performed.

When single-sided printing is performed on the paper, and normal output is performed, paper is outputted to the paper-discharge unit 90 with the surface of the side on which the image is formed facing upward. Therefore, the user can quickly check the images (text and the like) on the outputted paper. However, other persons in the vicinity of the image forming apparatus 1, in the same way as the user, can similarly view the images.

On the other hand, in the case of confidentiality-protected output, differing from the case of normal output, paper is outputted to the paper-discharge unit 90 so that the images on the outputted paper are shielded. When paper is conveyed by the paper-conveying mechanism 16, a paper-inverting unit 17 that turns the paper over after images are printed is provided for confidentiality-protected output. However, confidentiality-protected output can also be performed without using a paper-inverting unit 17. The specific contents of confidentiality-protected output will be described later.

Figure 3:
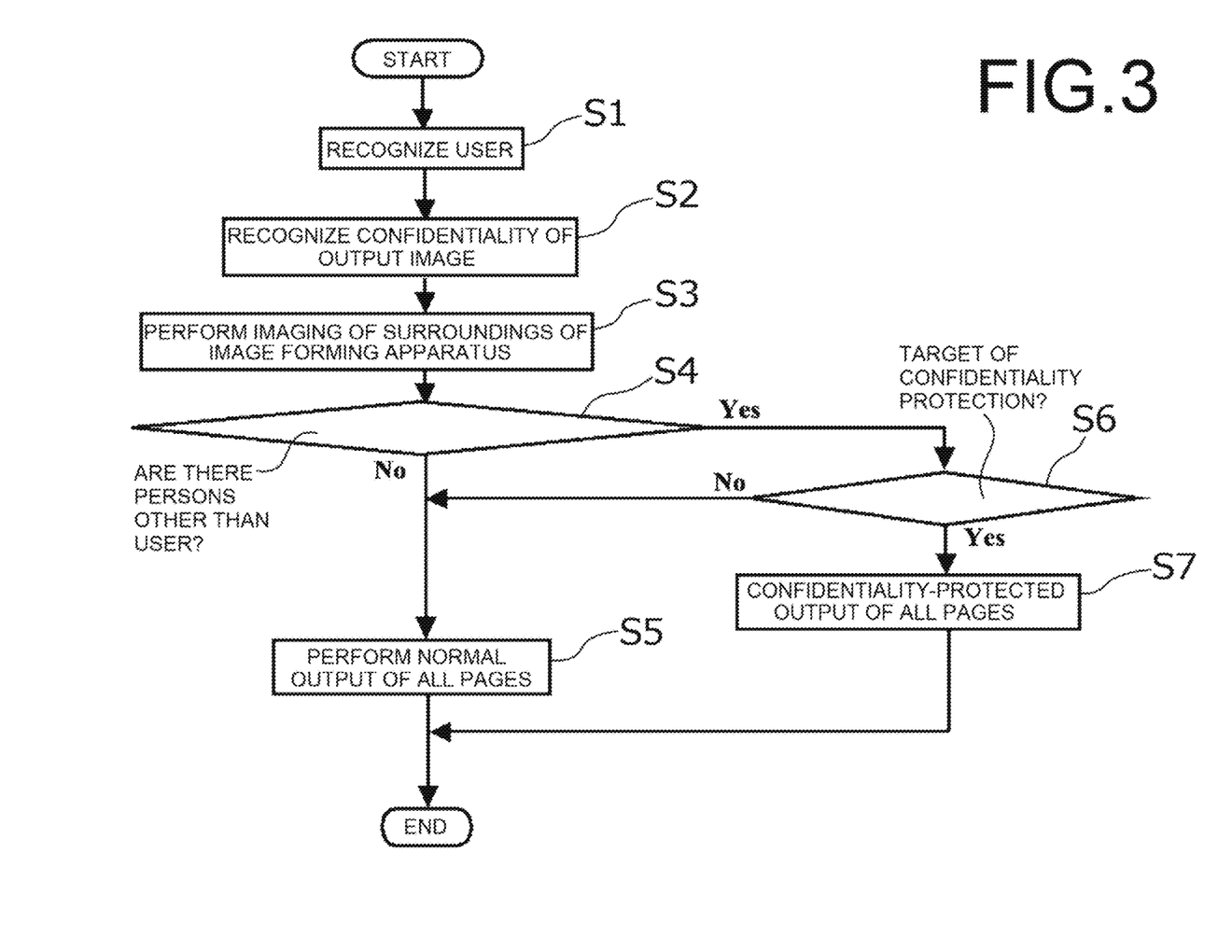
FIG. 3 is a flowchart illustrating a first example of operation that is performed by an image forming apparatus of an embodiment according to the present disclosure.

FIG. 3 is a first example of a flowchart illustrating the operation of the control unit 20. This operation is aimed at the case of single-sided printing output. Moreover, this operation is performed for every printing job. Here, first, the user operates the operation panel 11 so that output by the image forming apparatus 1 is performed (operation so that paper on which an image is formed is outputted to the paper-discharge unit 90). By taking an image of this state by the imaging unit 80, the control unit 20 recognizes the user as described above (S1). Information of the recognized user (image data of the face and the like) is stored in the user-information-storage unit 25. After that, before performing output, the control unit 20, by the image-data-analyzing unit 23 and confidentiality-recognizing unit 24, determines for the images on all of the pages to be outputted whether or not the images are to be the target of confidentiality protection (S2).

After that, the control unit 20 again uses the imaging unit 80 to perform imaging of the surroundings of the image forming apparatus (S3), and uses the imaging-data-analyzing unit 21 and person-recognizing unit 22 to reference the user-information-storage unit 25 and determine whether or not there are persons (other persons) in the images taken by the imaging unit 80 other than the recognized user (S4). When the presence of other persons is not recognized (S4: NO), normal output is performed for all of the pages (S5). In this case, paper is outputted to the paper-discharge unit 90 so that the front surface of the paper that is the side on which an image is formed is the upward facing side.

When it is recognized that there are other persons in the images taken by the imaging unit 80 (S4: YES), operation is then performed according to whether or not the images are to be the target of confidentiality protection (S6). First, when the images outputted here (for all pages) are not to be the target of confidentiality protection (S6: NO), normal output is performed as in the case described above (S5). In other words, when the images are not to be the target of confidentiality protection, normal output is similarly performed regardless of whether or not there are other persons present (S5).

On the other hand, when images to be outputted here are to be the target of confidentiality protection (S6: YES), confidentiality-protected output is performed (S7). Here, the paper-inverting unit 17 described above is used, and after the image is formed and fixed on the paper, the paper is turned over and outputted to the paper-discharge unit 90 in FIG. 1. Therefore, in the paper-discharge unit 90, the back surface of the paper on which an image is not formed become the upward facing side, and neither the user nor other persons can see the images formed on the paper in the paper-discharge unit 90. Therefore, by performing the operation illustrated in FIG. 3, it is possible to protect confidentiality of images to be outputted. Incidentally, when confidentiality-protected output is performed, preferably a display indicating that fact will be displayed on the display unit 12.

In the operation in FIG. 3, imaging (S3) and determining whether or not other persons are present (S4) are performed only one time before output is performed, and either normal output (S5) or confidentiality-protected output (S7) is performed according to the result of this determination. Here, there are cases in which output includes plural pages (plural sheets of paper), however, in both normal output (S5) and confidentiality-protected output (S7), the state is same for each sheet of paper outputted (the front surface faces upward, or the back surface faces upward).

However, when a large number of pages are to be outputted, other persons may not be present when printing (output) begins, however, other persons may come near the image forming apparatus 1 after that. The operation of the flowchart of a second example illustrated in FIG. 4 is applied in such a case.

Figure 4:
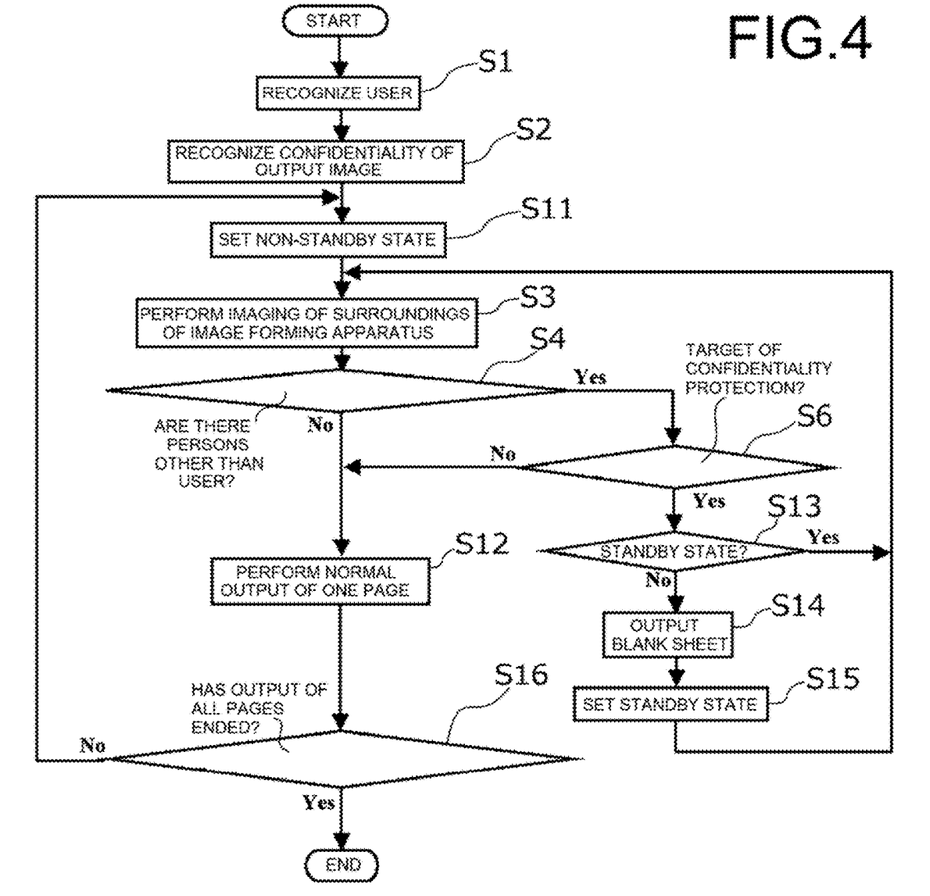
FIG. 4 is a flowchart illustrating a second example of operation that is performed by an image forming apparatus of an embodiment according to the present disclosure.

In the flowchart in FIG. 4, recognizing the user (S1) and recognizing whether or not the image is confidential (S2), as described above, are performed before the paper is outputted. However, the specific contents of imaging by the imaging unit 80 (S3) and determining whether or not other persons are present (S4) are the same as described above, however, these operations are performed every time before outputting each page. Moreover, in this operation, a state of waiting without performing printing and output of a certain page (standby state), or a state of performing printing and output right away (non-standby state) is set. The non-standby state is set as a default (S11).

When the presence of other persons is not recognized before the output of a certain page (S4: NO), this one page is outputted by normal output, or in other words, the paper is outputted to the paper-discharge unit 90 with the front surface (surface of the side on which an image is formed) facing upward (S12). When the presence of other persons is recognized (S4: YES) and the image is to be a target of confidentiality protection (S6: YES), first, whether or not the standby state is currently set is determined (S13). At this point, when the presence of other persons is recognized for the first time (S4: YES), the non-standby state is set (S11, S13: NO), so a blank paper (paper on which no image is formed) is outputted instead of paper on which an image is formed (S14). After that, the standby state is set (S15). After that, imaging (S3) and determining whether or not other persons are present (S4) are performed again. When other persons are present (S4: YES) and the image is to be the target of confidentiality protection (S6: YES), the standby state is set (S15, S13: YES), so imaging (S3) and determining whether or not other persons are present (S4) are performed again. Therefore, after a blank sheet is outputted to the paper-discharge unit 90, further output is stopped until it is recognized that there are no other persons present (S4: NO).

When it is recognized that there are no other persons present (S4: NO), normal output is performed (S12). After that, operation after setting the non-standby state (S11), imaging (S3) and determining whether other persons are present (S4) is similarly performed for every page until output of all of the pages is performed (S16: YES). In this case as well, the presence of other persons is recognized, so when output is stopped (S12) because a blank sheet is outputted (S14) or because the standby state is set after that (S15), preferably a display indicating this fact is displayed on the display unit 12.

With this kind of operation as well, it is possible to protect the confidentiality of the output of paper on which an image is formed and for which confidentiality protection is required. In this operation, a paper-inverting unit 17 is not used. When outputting a blank sheet (S14), the paper may bypass the image-forming unit 15, or the image-forming unit 15 may be set so that blank output is performed.

Figure 5A:
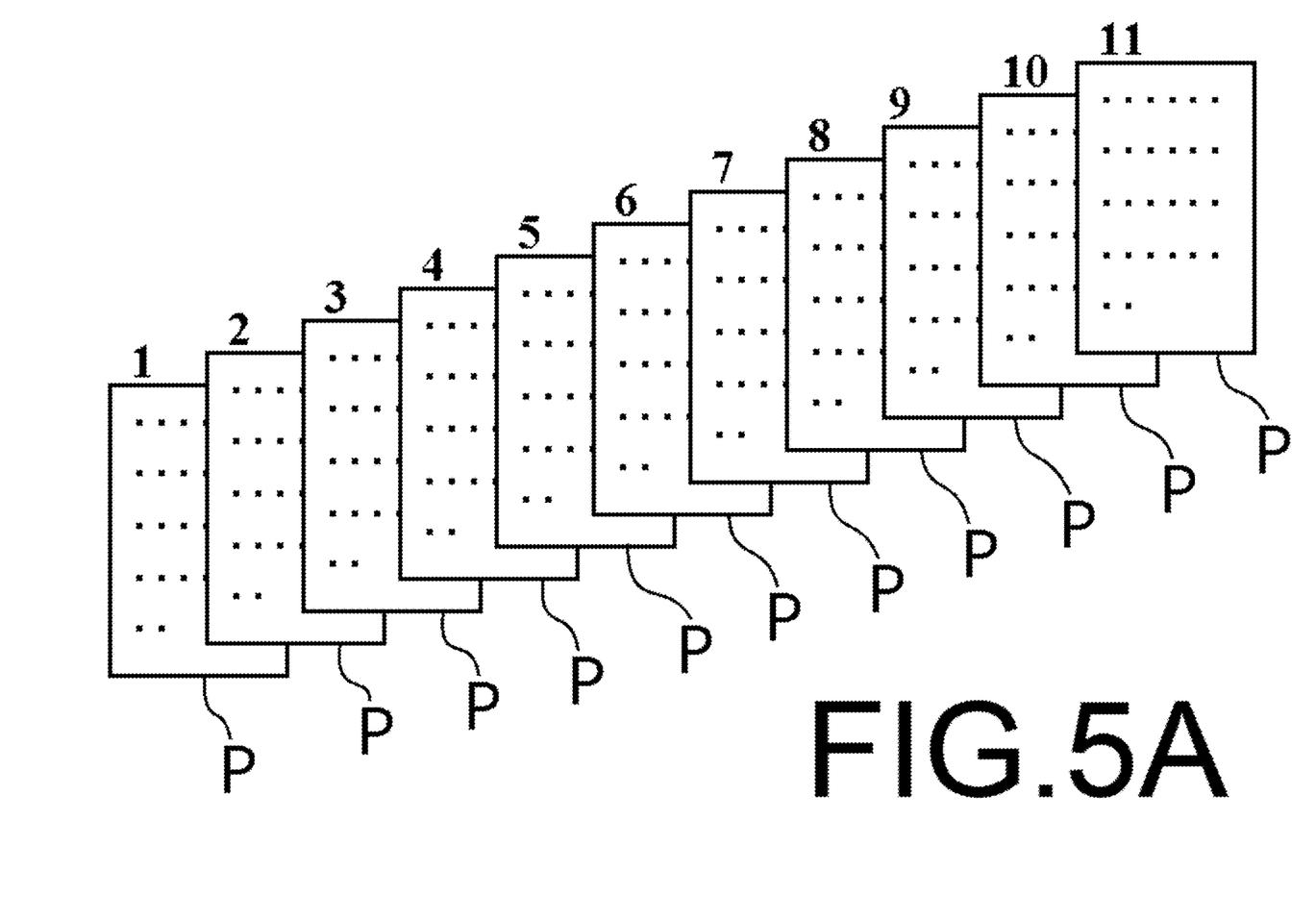
FIG. 5A illustrates a state in which paper is output according to the second example of operation that is performed by an image forming apparatus of an embodiment according to the present disclosure.
Figure 5B:
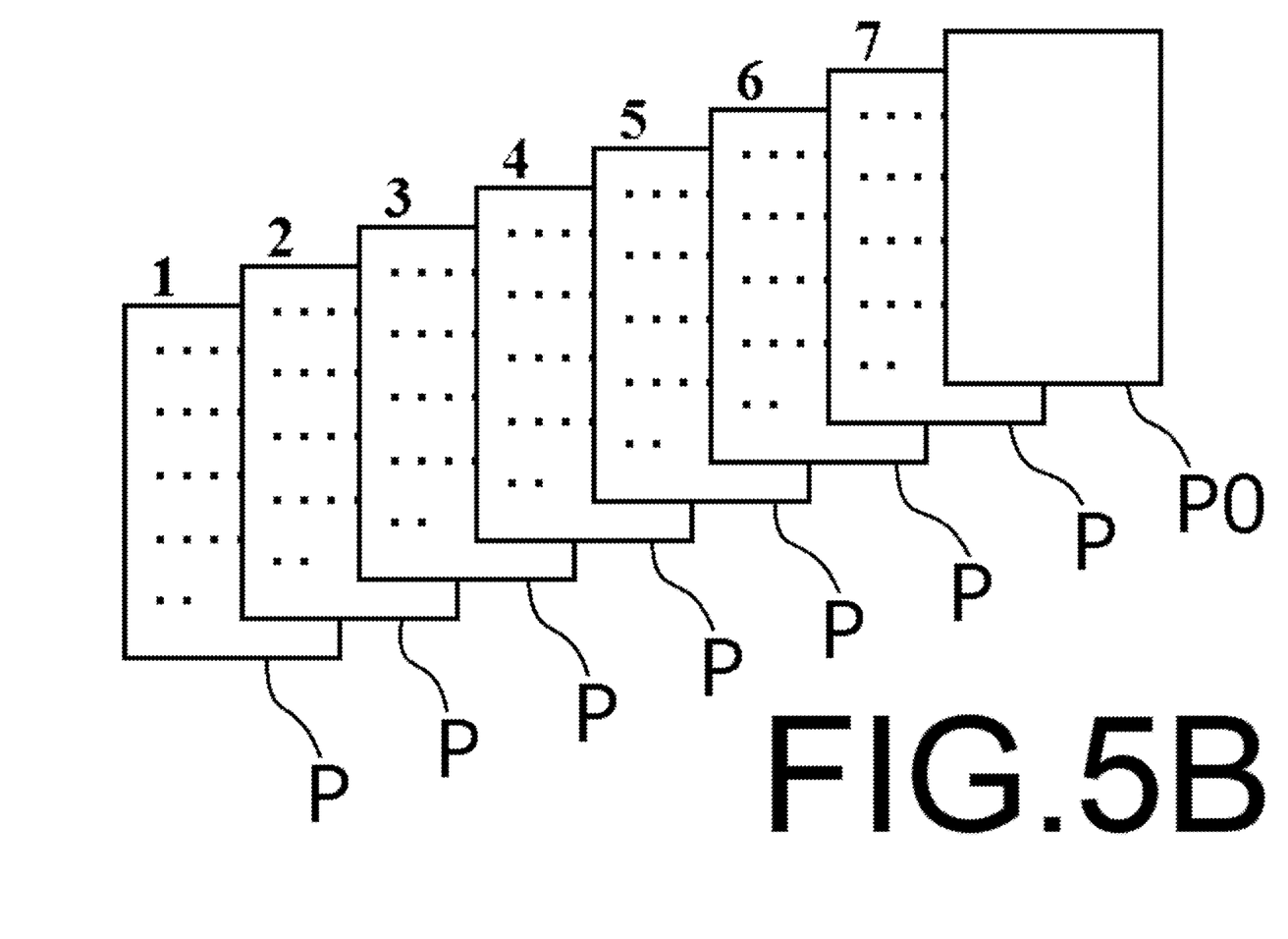
FIG. 5B illustrates a state in which paper is output according to the second example of operation that is performed by an image forming apparatus of an embodiment according to the present disclosure.
Figure 5C:
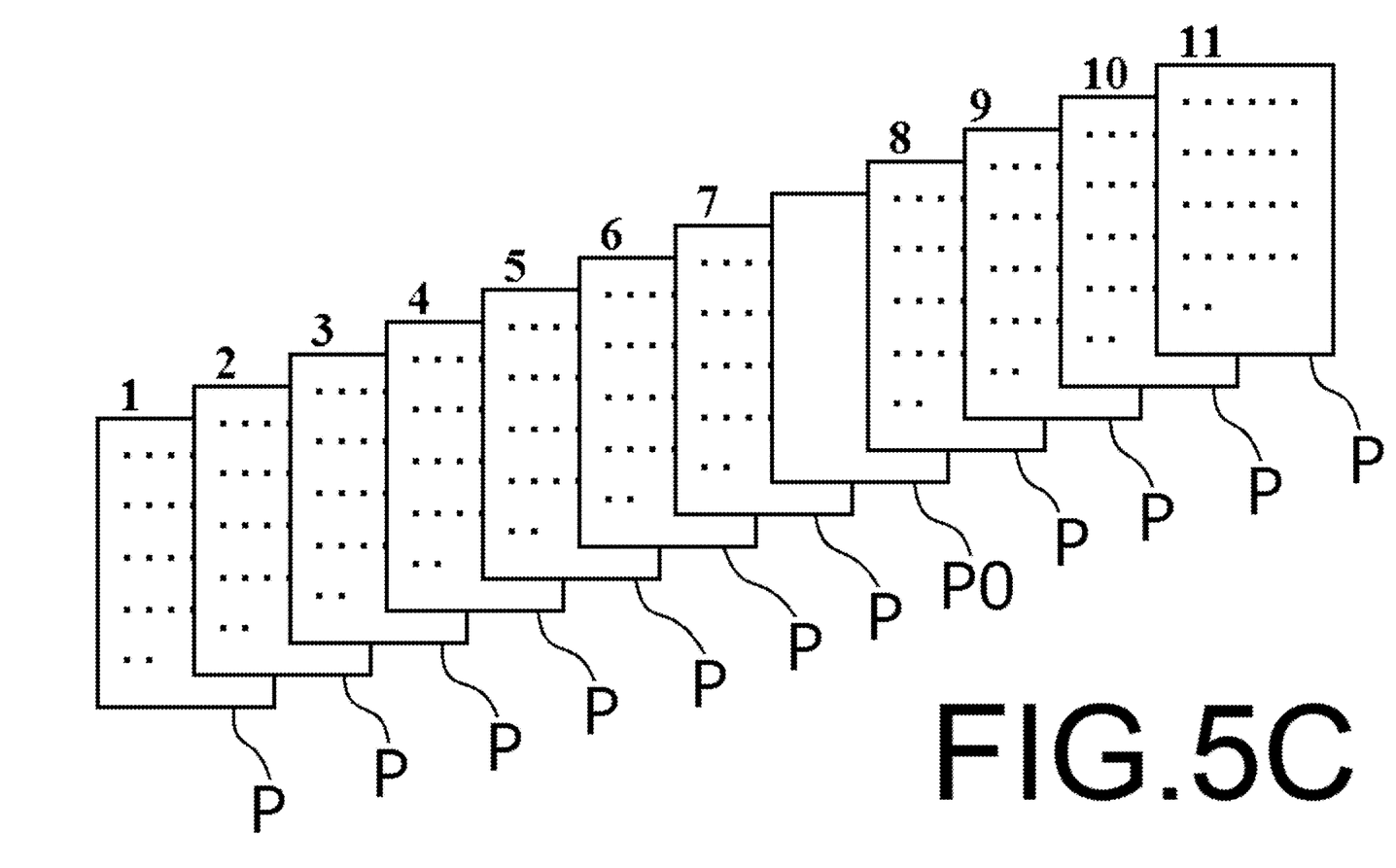
FIG. 5C illustrates a state in which paper is output according to the second example of operation that is performed by an image forming apparatus of an embodiment according to the present disclosure.

FIG. 5A illustrates the output state in the paper-discharge unit 90 when confidentiality-protected output is not applied at all when outputting 11 pages of paper P. FIG. 5B illustrates the output state in the paper-discharge unit 90 when the presence of other persons could be recognized after outputting the seventh page and the other persons are still present. FIG. 5C illustrates the output state in the paper-discharge unit 90 when the other persons leave after that. In the case of FIG. B, a blank sheet P0 is added after the seventh page of paper P, and as a result, at this point the seventh page of paper P that is printed out the very last is shielded. This state is maintained until the other persons leave, and after the other persons leave, the state in the paper-discharge unit 90 is finally set to a state such as illustrated in FIG. 5C. During output, the user can easily recognize the page that is a blank sheet P0, so the user can remove the blank sheet P0 later, and can use all of the outputted pages.

Moreover, in the operation in FIG. 4, when recognizing whether or not the image to be outputted is confidential (S2), the control unit 20 can recognize pages on which there is a character string used for recognizing confidentiality. Therefore, as a result, it is possible to perform a setting so that only pages that are especially the target of confidentiality protection will be shielded. In the operation in FIG. 4, when outputting blank sheets (S14), it is possible to perform a setting so that that output of a blank sheet (S14) is not performed when it is recognized in this way that the paper outputted immediately before is not a target of confidentiality protection. In this case, the next page is simply not outputted until the other persons leave, and the finally outputted state is the same as in the case illustrated in FIG. 5A when confidentiality-protected output is not applied at all.

Figure 6:
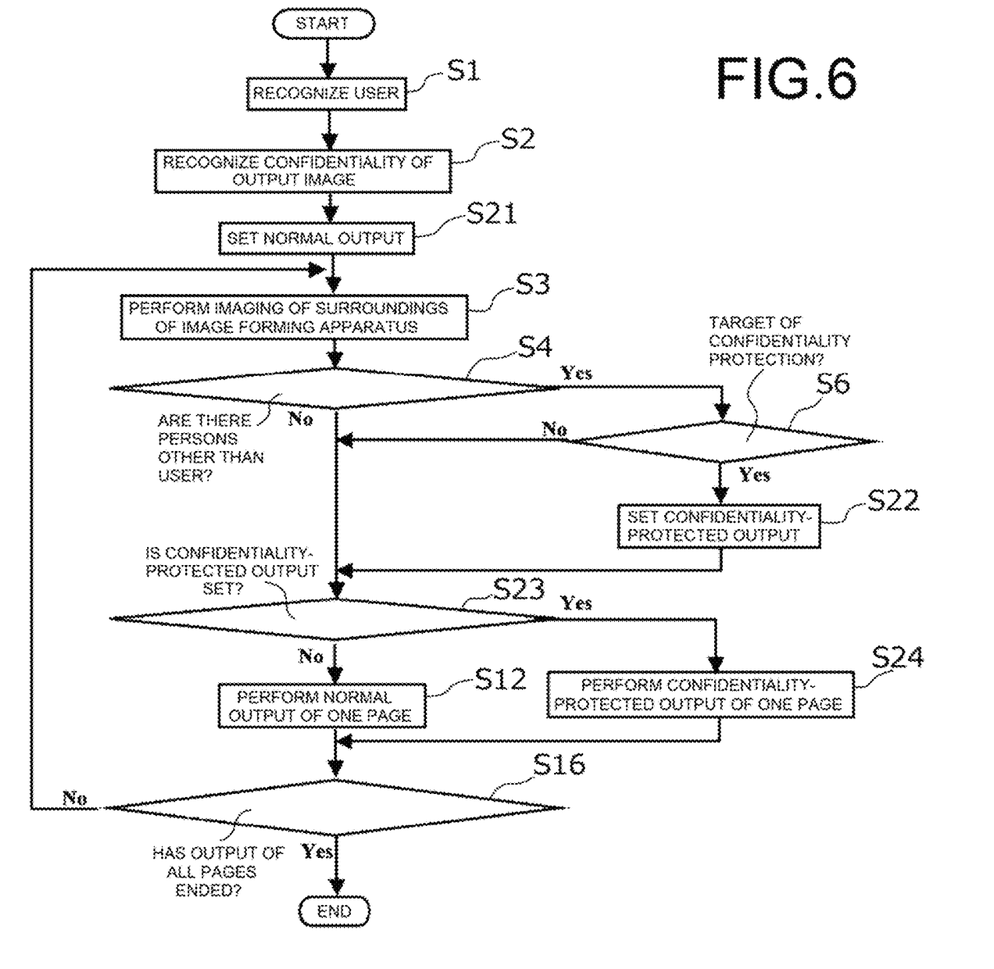
FIG. 6 is a flowchart illustrating a third example of operation that is performed by an image forming apparatus of an embodiment according to the present disclosure.

Moreover, similar to the operation in FIG. 4, there is operation (third example) according to the flowchart illustrated in FIG. 6 as an operation that can change the method of output during output of plural pages. Here, as the confidentiality protection operation, an operation of turning over the paper to be outputted is performed in the same way as the operation in FIG. 3.

Even in the operation in FIG. 6, recognizing the user (S1) and recognizing whether or not there is confidentiality (S2) are performed in the same way as described above. After that, before imaging (S3) is performed the first time, normal output is set as the default output state setting (S21). The following operation is performed for every page, and as described above, whether or not other persons are present in the obtained imaging image is determined (S4). Here, when the presence of other persons is not recognized (S4: NO), the output state setting (S21) is not changed.

Moreover, when the presence of other persons is recognized (S4: YES) but the output is not the target of confidentiality protection (S6: NO), as described above, the output state setting (S21) is not changed. On the other hand, when the presence of other persons is recognized (S4: YES) and only when the output is recognized as being the target (S2) of confidentiality protection (S6: YES), the output state setting is changed so as to be confidentiality-protected output (S22). After that, output of this page is performed based on this kind of setting (S23), and when normal output is set (S23: NO), normal output (S12) for one page is performed. Moreover, when confidentiality-protected output is set (S23: YES), confidentiality-protected output (S24) for one page is performed. When this output ends, however output of all of the pages is not finished (S16: NO), the operation described above is repeated from imaging (S3).

In this operation, even when the output is recognized as the target (S2) of confidentiality protection (S6: YES), normal output is performed (S12) until the presence of other persons is once recognized (S4: YES). After the presence of other persons is recognized (S4: YES), even though the other persons leave after that, the setting as confidentiality-protected output (S22) is not changed after that, and the following output is all performed as confidentiality-protected output (S24).

Figure 7:
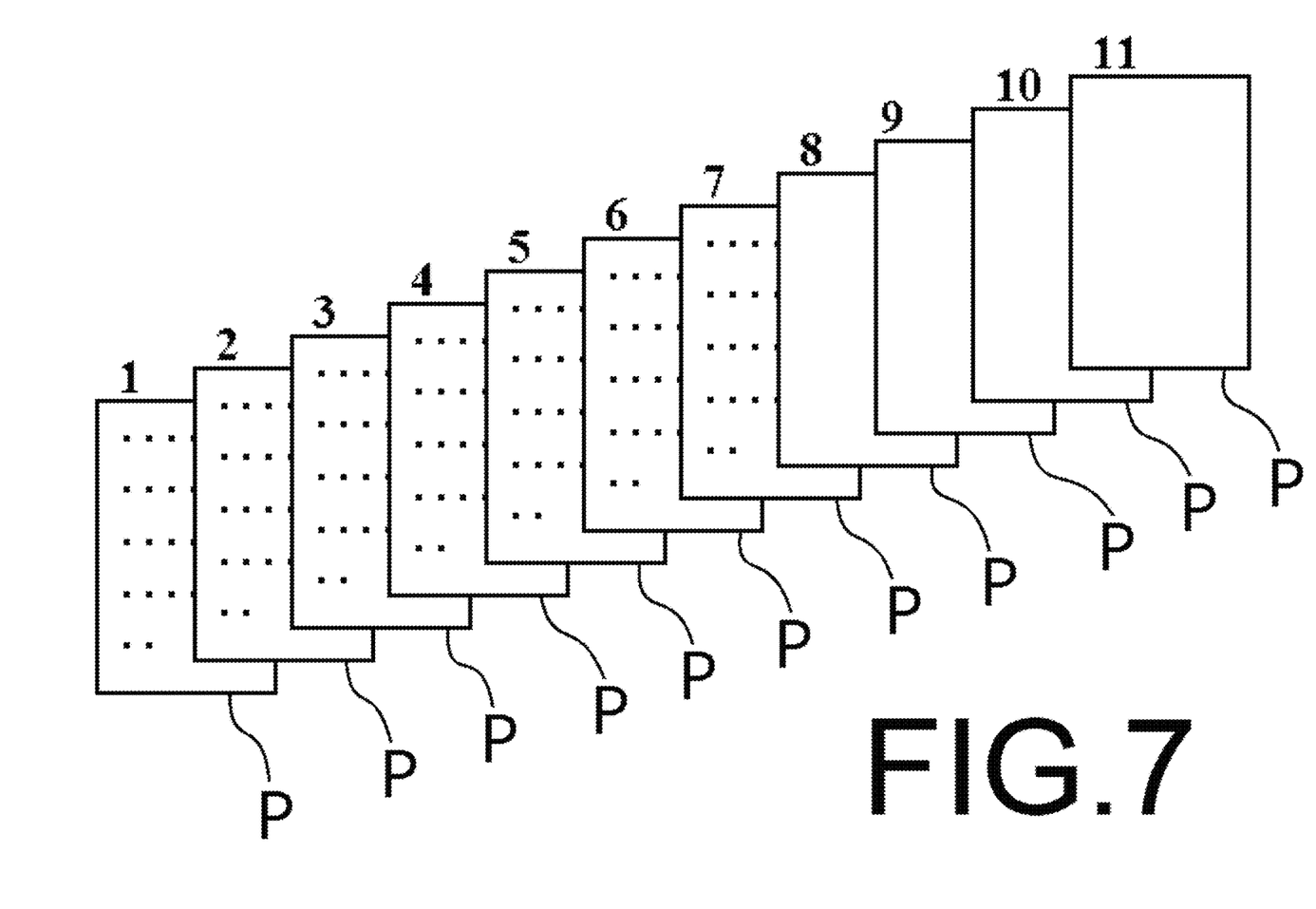
FIG. 7 illustrates a state in which paper is output according to the third example of operation that is performed by an image forming apparatus of an embodiment according to the present disclosure.

FIG. 7 illustrates the output state of paper P in the paper-discharge unit 90 when the operation in FIG. 6 is performed in correspondence to FIG. 5A to FIG. 5C. In the case of FIG. 7, the paper P after the eighth page is outputted with the back side facing upward. In the operation in FIG. 4, the operation is temporarily stopped in the state in FIG. 5B, however, in the operation in FIG. 6, operation is continuously performed, so output of all pages can be performed quickly. Moreover, blank sheets P0 are not necessary, so paper for that is not consumed.

In the operations in FIGS. 3, 4 and 6, the case of performing output of single-sided printing is the target. However, presuming that the operations in FIG. 3 and FIG. 6 are applied to the case of performing output of double-sided printing, there are images also on the back surface side, so in some cases confidentiality protection is not possible by these operations. However, the operation in FIG. 4 of outputting blank sheets is similarly effective in both the case of single-sided printing and double-sided printing. In other words, in the case of double-sided printing, performing the operation in FIG. 4 is particularly preferred.

Moreover, as described above, the aforementioned operations are performed for every printing job, and the control unit 20 can recognize whether a printing job is single-sided printing or double-sided printing. Therefore, when an inputted printing job is single-sided printing, performing the operation in FIG. 3 or FIG. 6 can be set, and when the printing job is double-side printing, performing the operation in FIG. 4 can be set. As a result, the operation in FIG. 4 for which there is a possibility of the waiting time becoming long is applied only to double-sided printing, so work can be performed efficiently.

In this case, when plural printing jobs are inputted, the priority of the printing jobs can be set in consideration of the operations described above. For example, it is presumed that one printing job (first printing job) is single-sided printing, and that the output of that printing job is to be the target of confidentiality protection. It is also presumed that another printing job (second printing job) is double-sided printing, and that the output of that printing job is to be the target of confidentiality protection. In the case of the settings described above, there is a possibility that the waiting time will become long due to the presence of other persons in the case of double-sided printing, however, such waiting time does not occur in the case of single-sided printing. Therefore, in such cases, the control unit 20 preferably operates the image forming apparatus 1 by lowering the priority of the second printing job, of which there is a possibility of the occurrence of long stopping times, lower than the first printing job.

Incidentally, in the examples described above, whether or not there is confidentiality in an image that is to be outputted on paper is determined according to whether or not there is a specific character string in the image. However, it is also possible to determine (set) whether or not there is confidentiality by other matter, or by further combination of other matter. For example, even when other persons are present, when the distance between the other persons and the image forming apparatus 1 (paper-discharge unit 90) is far, the necessity for confidentiality-protected output is low, and when this distance is close, the necessity for confidentiality-protected output becomes high. Therefore, the distance between other persons recognized by the imaging unit 80 and the image forming apparatus 1 can be used as the aforementioned other matter. Here, high accuracy is not required for this distance, so the imaging-data-analyzing unit 21 can recognize this distance when recognizing persons in the imaging data.

Moreover, in the examples described above, a state of confidentiality or no confidentiality is set for the confidentiality of images to be outputted. However, actually, the degree of the need for confidentiality (confidentiality level) may be set in plural stages according the to importance and the like of the contents. In Table 1, examples of character strings that are used for determining whether or not there is confidentiality as described above are further classified into three specific types. Here, the degree of required confidentiality becomes higher in the order of the confidential level "high", "medium", and "low".

Here, when the confidentiality level is high, making the outputted images difficult for other persons to see is required. On the other hand, when the confidentiality level is low, even though the outputted images become easy for other persons to see, in some cases it may be preferable for the user that the images at the paper-discharge unit 90 are easy to see. Therefore, whether or not there is confidentiality (whether or not to perform confidentiality-protected output when other persons are present) may be set according to the confidentiality level and the above-described distance. In other words, distance threshold values are set according to each confidentiality level, and not only when the presence of other persons is recognized, but also when the distance with respect to the recognized persons is less than the threshold values, it is possible to perform operation when it is determined that there is confidentiality in the operation described above.

TABLE 1

| Confidentiality Level | Keyword Example | Distance Threshold Value |
|---|---|---|
| Low | Conference, meeting, Briefing, and the like | 2 m |
| Medium | Management policy, business results, internal memo, and the like | 5 m |
| High | Company secret, secret, safety, confide(ntial), and the like | 10 m |

In Table 1, the distance threshold value is set to be larger in the order of high confidentiality level. Therefore, when the confidentiality level is high, confidentiality-protected output is performed even when other persons are far away, and it becomes easy to perform confidentiality-protected output. Consequently, it becomes more difficult for other persons to see images, however, it also becomes difficult for the user to see images. On the other hand, when the confidentiality level is low, confidentiality-protected output becomes difficult to perform. Therefore, even though the possibility that others will see images is slightly increased, the user will be able to more easily see images. Therefore, convenience for the user is further improved.

In this case, in the operations in FIGS. 3, 4 and 6, instead of recognizing the confidentiality of output images (S2), determination of whether the confidentiality level is "high", "medium" or "low" may be performed. Then, instead of determining whether or not an image is a target of confidentiality protection (S6), determination of whether or not the distance from other persons is less than a threshold value that corresponds to the confidentiality level may be performed.

In this example, in order to adjust in stages the ease of using confidentiality-protected output according to the confidentiality level, the distance from other persons such as described above is used. However, other than this distance other parameters having a similar purpose can also be used.

Incidentally, in the configuration described above, recognizing a user is performed using imaging data by the imaging unit 80. In other words, the imaging unit 80 and imaging-data-analyzing unit 21 are used as a user-recognizing unit for recognizing a user that operates the image forming apparatus 1. Such a setting is particularly preferred when an unspecified number of persons use the image forming apparatus 1. However, when the users are limited, persons that will be users are preregistered, and a control unit may recognize a user by the user entering an identification number or the like from the operation panel, for example. In such a case as well, by recognizing image information of the user's face or the like, after that, it is possible to determine whether or not there are other persons in the image data obtained by the imaging unit. In other words, in this examples described above, the imaging unit 80 and the imaging-data-analyzing unit 21 are used as a user-recognizing unit, however, as long as users can be suitably recognized, other user-recognizing units can be used.

Moreover, in the examples described above, a confidentiality-recognizing unit 24 sets whether or not there is confidentiality or sets a confidentiality level according to characters in an image to be outputted. However, in configuration in which it is possible for a user to set whether or not there is confidentiality or set a confidentiality level via the operation unit, it is also possible to perform operations after that in the same way as described above. In other words, as the confidentiality-recognizing unit, it is also possible to use a unit that recognizes or sets these by some other method.

In the typical technology described above, an image forming apparatus is described that performs an operation in which, when confidentiality is high, an image on a display unit is reduced and made difficult to see, or the image is not displayed. However, in this typical technology, the target to be suppressed from the view of other persons is an image on the display unit, and it is possible for other persons to see outputted images that are formed on paper in the same way as a user. On the other hand, it is clear that performing the same processing on an image that is formed on paper as an image that is displayed on the display unit as described above is not preferable.

Therefore, there is a need to be able to protect the confidentiality of an image that is printed and outputted on paper.

With the configuration according to the present disclosure described above, it is possible to protect the confidentiality of an image that is printed and outputted on paper.

What is claimed is:

1. An image forming apparatus that outputs paper on which an image is formed, comprising:
   an imaging unit for performing imaging of surroundings;
   a user-recognizing unit for recognizing a user of the image forming apparatus;
   a person-recognizing unit for recognizing persons in imaging data obtained by the imaging unit; and
   a control unit for performing confidentiality-protected output of outputting the paper so that the image on the paper is shielded when the person-recognizing unit recognizes another person who is other than the user in the imaging data;
   wherein
   the control unit,
   when executing a printing job of forming and outputting the image on only a single surface of the paper, performs an operation of outputting with turning over the paper on which the image is formed when performing the confidentiality-protected output; and
   when executing a printing job of forming and outputting the image on both surfaces of the paper, performs an operation of outputting a blank sheet of paper, and then an operation of stopping the output of the paper on which the image is formed, when performing the confidentiality-protected output; and
   the control unit;
   when a first printing job of forming and outputting the image on only a single surface of the paper, and a second printing job of forming and outputting images on both surfaces of the paper are inputted in parallel, performs control to set the priority of the execution of the first printing job higher than the priority of the execution of the second printing job such that the image forming apparatus outputs the first printing job before the second printing job.

2. The image forming apparatus according to claim 1 further comprising
   a confidentiality-recognizing unit for recognizing whether or not there is confidentiality according to the image;
   wherein
   the control unit, when the person-recognizing unit recognizes that there is the other person in the imaging data, and the confidentiality-recognizing unit recognizes that the image to be outputted is confidential, causes the confidentiality-protected output to be performed.

3. The image forming apparatus according to claim 2, wherein the confidentiality-recognizing unit recognizes that there is confidentiality when a preset character string is recognized in the image.

4. The image forming apparatus according to claim 2, wherein the confidentiality-recognizing unit recognizes a distance between the image forming apparatus and the other person when the other person is recognized in the imaging data, and recognizes that there is confidentiality when the distance is shorter than a preset threshold value, and a preset character string is recognized in the image.

5. The image forming apparatus according to claim 4, wherein plural character strings are set and classified according to plural types, and the threshold values are set for each of the types.

6. The image forming apparatus according to claim 1, wherein the user-recognizing unit recognizes the user from the imaging data obtained by the imaging unit when the image forming apparatus is operated by the user.

7. The image forming apparatus according to claim 1, wherein the control unit, when performing the confidentiality-protected output, causes a blank sheet of the paper to be outputted when outputting plural pages of the paper on which images are formed, and then stops output of the paper on which the images are formed.

8. The image forming apparatus according to claim 7, wherein the images are formed on both surfaces of the paper, and outputted.

9. The image forming apparatus according to claim 1, wherein the control unit, when performing the confidentiality-protected output, turns over and outputs the paper on which the image is formed.

10. The image forming apparatus according to claim 9, wherein the control unit, when performing the confidentiality-protected output, turns over and outputs the paper that outputted after the other person who is other than the user is recognized in the imaging data when outputting plural pages of the paper on which images are formed.

11. The image forming apparatus according to claim 9, wherein the images are formed and outputted on only one surface of the paper.

* * * * *